April 30, 1935.    A. E. GERLAT ET AL    1,999,187
ROTARY INTERNAL COMBUSTION ENGINE
Filed April 29, 1933    3 Sheets-Sheet 1

Inventors
A. E. Gerlat
A. C. Hoppe
A. F. Pieper

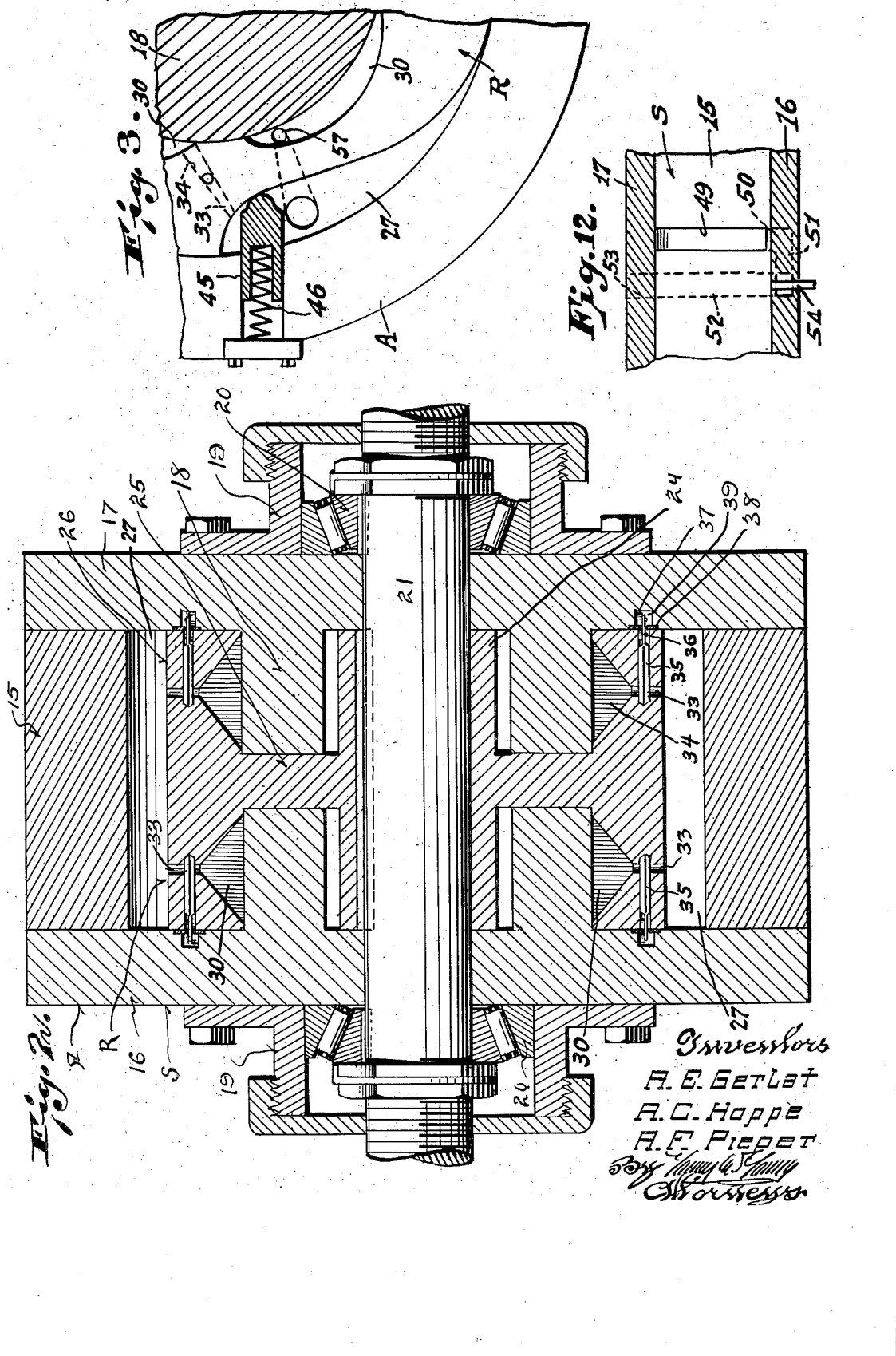

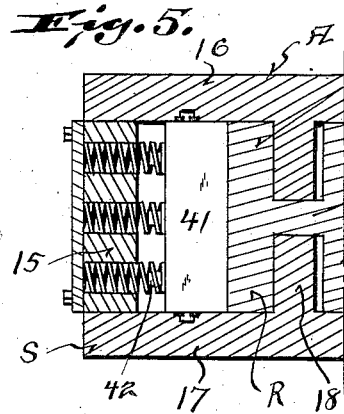
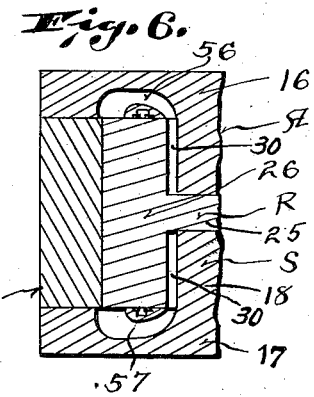
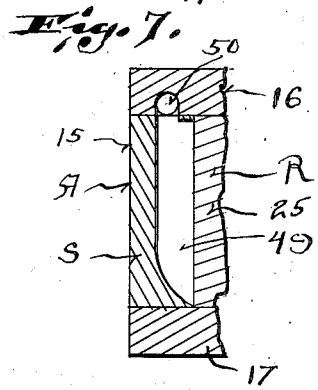
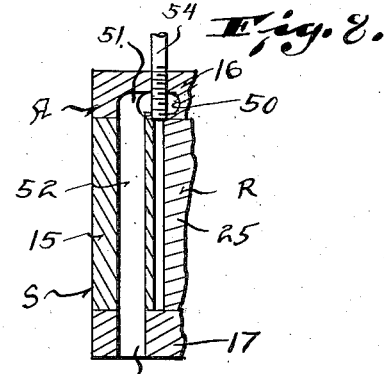
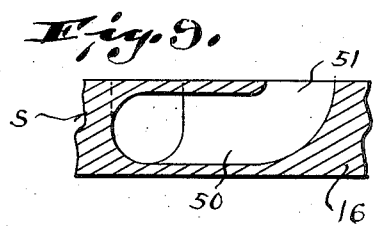
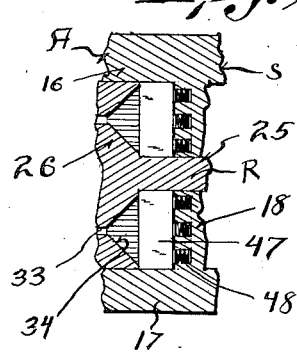
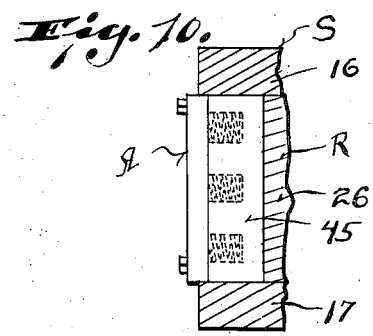

Patented Apr. 30, 1935

1,999,187

UNITED STATES PATENT OFFICE 1,999,187

ROTARY INTERNAL COMBUSTION ENGINE

Adolph E. Gerlat, Andrew C. Hoppe, and
Anthony F. Pieper, Milwaukee, Wis.

Application April 29, 1933, Serial No. 668,600

9 Claims. (Cl. 123—14)

This invention appertains to motors and more particularly to rotary internal combustion engines of the type wherein the power impulses are delivered substantially at a tangent to the periphery of the power wheel or rotor carried by the drive shaft, so that a steady flow of power can be delivered to the shaft without the use of intermediate translation mechanism and without undue torque stress on the shaft.

In motors of this character, considerable difficulty has been experienced in properly delivering the charge to the combustion chambers and for adequately compressing the charge at the point of firing, as well as properly scavenging the chambers after the power thrust.

It is therefore one of the primary objects of our invention to provide novel means for delivering the charge to the engine and to provide means for compressing the charge, so that a substantially high compression motor will be had and whereby the motor will function in a highly satisfactory manner.

Another salient object of our invention is the provision of novel means for positively exhausting or scavenging the combustion chambers at the end of the power stroke, so that these chambers will be free from all spent gases and in condition for receiving the fresh charge.

A further important object of our invention is the provision of novel means for preheating the charge by the exhaust gases prior to the intaking of the charge into the combustion chambers, the exhaust passageways being formed in a novel manner for insuring the proper heating of the incoming charge or fuel mixture.

A further object of our invention is the provision of novel means for cooling the stator at the combustion point, so that the stator or casing will not be affected by undue heat and consequent distortion.

A further object of our invention is the provision of means whereby the charge or fuel mixture is subjected to first a primary compression and then to a secondary compression, the secondary compression taking place at a point adjacent to the spark plug whereby not only will the fuel charge be compressed to a high degree, but whereby loss of compression is reduced to a minimum.

A still further object of our invention is to provide an improved rotary internal combustion engine of the above character, which will be durable and efficient in use, one that will be simple and easy to manufacture, one which will embody a minimum number of moving parts and one which can be placed upon the market at a reasonable cost.

With these and other objects in view, the invention consists in the novel construction, arrangement and formation of parts, as will be hereinafter more specifically described, claimed, and illustrated in the accompanying drawings, in which:—

Figure 2 is a diametrical section through the motor taken substantially on the line 2—2 of Figure 1 looking in the direction of the arrows illustrating the novel construction of the stator casing and the rotor.

Figure 3 is a fragmentary sectional view showing the abutment in a combustion chamber for initially compressing the fuel through the passageways into an inner compression chamber.

Figure 5 is a fragmentary transverse section through the motor taken on the line 5—5 of Figure 1, illustrating the arrangement of the main slide abutment plate for the firing chamber.

Figure 6 is a fragmentary transverse section taken substantially on the line 6—6 of Figure 1 looking in the direction of the arrows illustrating the means of transferring the charge after its initial compression to the internal compression chambers for the second and final compression.

Figure 7 is a detail section taken on the line 7—7 of Figure 1 looking in the direction of the arrows illustrating the cavity in the rim of the stator for receiving the exhaust gases.

Figure 8 is a detail section taken on the line 8—8 of Figure 1 looking in the direction of the arrows illustrating a construction of the exhaust outlet and the means for preheating the fuel mixture or charge.

Figure 9 is a detail section through one of the cover plates, taken on the line 9—9 of Figure 1 looking in the direction of the arrows, illustrating the connecting passage for the exhaust receiving cavity and the exhaust outlet.

Figure 10 is a detail fragmentary section taken on the line 10—10 of Figure 1 looking in the direction of the arrows illustrating the slide or abutment plate for operating in conjunction with the firing chambers for initially compressing the charge.

Figure 11 is a detail fragmentary section taken substantially on the line 11—11 of Figure 1 looking in the direction of the arrows, illustrating the construction and arrangement of the slide or abutment plates for operating in conjunction with the internal compression chambers for finally compressing the charge.

Figure 12 is a detail fragmentary section illustrating the arrangement of the intake and outlet passageways.

Referring to the drawings in detail, wherein similar reference characters designate the corresponding parts throughout the several views, the letter A generally indicates our improved motor, which comprises the stator or casing S and the rotor or power wheel R.

Figure 1:
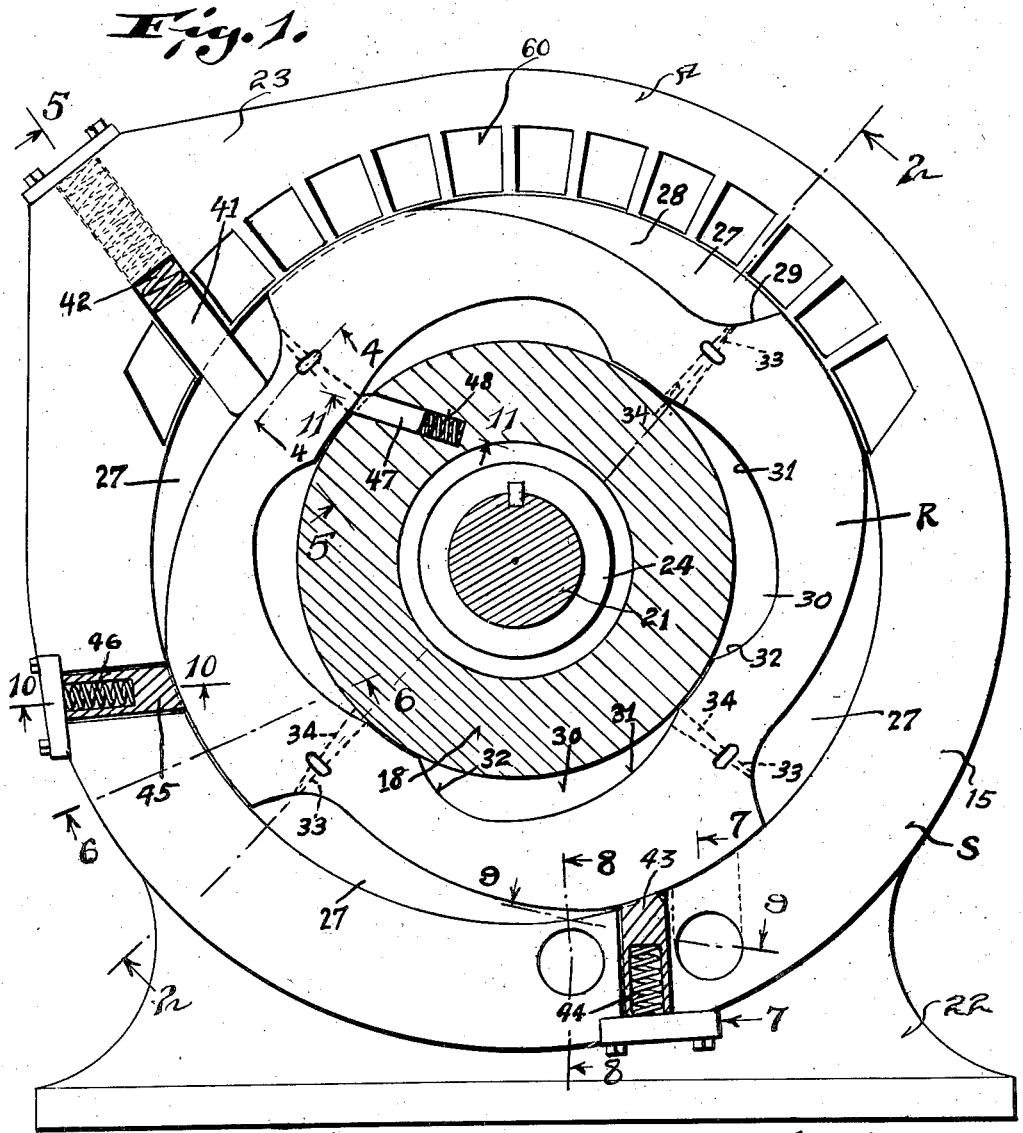
Figure 1 is a side elevation of our improved motor, parts thereof being shown broken away and in section.
Figure 4:
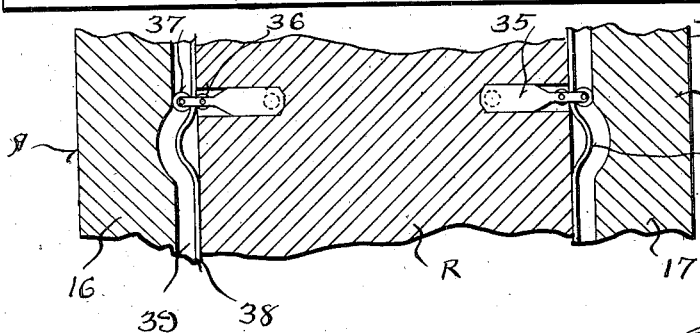
Figure 4 is an enlarged fragmentary detail section taken substantially on the line 4—4 of Figure 1 illustrating the novel arrangement of the guide tracks for opening and closing the slide valves for the proper delivery of the compressed charge to the combustion chambers.

The stator or casing S is constructed in a novel manner and forms a salient feature of our invention. As shown, the same embodies an annular casing rim 15, which may be constructed in arcuate sections suitably joined together, if so desired. Connected to the opposite sides of the annular casing rim 15 are side plates 16 and 17 and each of these plates have formed on their inner faces inwardly extending annular shoulders 18, which are concentrically disposed relative to the axial center of the plates 16 and 17 and the rim 15. These annular shoulders 18 terminate short of one another and short of the longitudinal center of the casing, for a purpose which will be hereinafter more fully set forth. Any desired means such as cap screws or the like can be employed for detachably securing the plates to the rim.

Carried by the outer faces of the plates 16 and 17 are suitable bearing boxes 19 supporting roller or like bearings 20 for the shaft 21 which extends axially through the casing. The casing can be provided with any preferred type of base 22 or the like to permit the connection thereof to a support or frame. At one side, the rim and the casing plates are preferably provided with an enlargement 23, for a purpose which will be hereinafter set forth.

The rotor R is of a novel construction and embodies an elongated axially disposed hub sleeve 24, which can be keyed or otherwise secured to the shaft 21. Extending radially from the central portion of the hub sleeve 24 is the connecting plate 25 which carries the rim 26 of the rotor. By referring to Figure 2 of the drawings, it will be noted that in assembling the device the rotor R is first placed within the rim 15 after which the plates 16 and 17 are placed in position with the annular shoulders 18 extending into the rotor intermediate its heavy rim 26 and its hub sleeve 24.

The outer face of the rotor rim 26 is provided at equidistantly spaced points with combustion chambers 27, which cooperate with the inner face of the casing rim 15. As shown, these combustion chambers embody an inclined bottom wall 28 which gradually leads toward the periphery of the rotor rim and an abrupt end wall 29.

The inner face of the rotor rim on opposite sides of the supporting hub plate 25 is provided with equidistantly spaced compression chambers 30 which chambers also embody an inclined bottom wall 31 and a relatively abrupt end wall 32. These chambers 30 cooperate with the outer faces of the annular shoulders 18 of the side plates 16 and 17, and the chambers 30 are located substantially intermediate the combustion chambers 27.

Valve ports 33 extend through the rotor rim and connect the narrow ends of the compression chambers 30 with the deep ends of the combustion chambers 27. By referring to Figure 2 of the drawings, it will be noted that these valve ports have their inner ends widened so as to extend substantially the full width of the compression chambers 30 to allow the free flow of the compressed charge from said chambers. Slide valves 35 are provided for controlling the flow of the compressed charge through said valve ports and novel means is provided for automatically operating said slide valves at the proper times.

This means for operating the slide valves embodies inner and outer actuating rollers 36 and 37, which are carried by the outer ends of the slide valves 35. These inner and outer rollers 36 and 37 engage the opposite faces of annular guide tracks 38 carried by the inner faces of the side plates 16 and 17. These faces of the side plates are formed with annular grooves 39 for receiving the outer rollers and the said guide tracks. The tracks at one point, namely, adjacent to the projection 23 on the casing, are provided with outwardly bowed hump portions 40; and obviously, when the rollers reach said out-turned portions 40, the slide valves 35 will be slid outwardly, so as to open the ports 33 and allow the establishing of communication between the compression chambers 30 and the combustion chambers 27.

Slidably carried by the projecting portion 23 of the casing or stator S is the main transversely extending gate or abutment plate 41. This abutment plate is normally urged into facial contact with the outer periphery of the rotor by means of expansion springs 42. Thus, the abutment plate 41 follows the contour of the outer face of the rotor and rides into and out of the combustion chambers. The purpose of this plate will also be hereinafter more fully described.

Arranged adjacent to the lower end of the casing or stator and carried by the rim 15 thereof is a transversely extending scavenging abutment plate or valve 43. This abutment plate 43 is likewise urged into intimate contact with the outer face of the rotor by means of expansion springs 44 and thus, the abutment plate likewise follows the contour of the rotor. Disposed intermediate the abutment plates 41 and 43 is a third abutment plate or gate valve 45. This abutment plate 45 is normally carried by the rim of the stator and is normally urged toward the outer face of the rotor by means of expansion springs 46.

Each of the shoulders 18 of the side plates 16 and 17 carry abutment plates or slide gate valves 47 and it is to be noted that these abutment plates 47 are arranged in close proximity to, but at one side of, the main combustion abutment plate 41. These compression or abutment plates 47 are normally urged into intimate contact with the inner face of the rim 17 of the rotor by means of expansion springs 48 and thus, these plates follow the contour of the inner face of the rotor rim.

The inner face of the stator rim 15 adjacent to its lower end and on one side of the scavenging abutment plate 43 has an exhaust cavity 49. This exhaust cavity at one side communicates at all times with a passageway 50 formed in the side plate 16. This passageway in turn communicates with a right-angularly extending passageway 51, which in turn communicates with a transversely extending outlet exhaust passageway 52 formed in the stator casing rim 15. The plate 17 is provided with an outlet exhaust port 53 which may have communicating therewith any preferred type of exhaust pipe (not shown).

Extending into and through the passageway 50 is the fuel charge inlet pipe 54 and during the rotation of the rotor, the various combustion chambers 27 communicate momentarily therewith and it is to be noted that this fuel charge inlet pipe 54 is located on the opposite side of the scavenging abutment plate 43 from the exhaust cavity 49.

Figure 12 clearly illustrates the above described arrangement, and from this figure it will be noted that the exhaust is initially received within the cavity 49 and flows through the passageways 50 and 51, and then out the passageway 52, which parallels the cavity 49. The fuel charge inlet pipe 54 extends entirely through the passageway 51, as is clearly shown in Figure 12.

Any preferred means (not shown) can be employed for carbureting the fuel mixture and if desired, the mixture can be supplied under pressure.

Disposed directly at one side of the main abutment plate 41 is a spark plug or similar firing device 55. This spark plug is carried by the plate 16 and is utilized as means for firing the compressed charge in the combustion chambers 27 as the same ride past the abutment plate 41. It is to be understood that any desired type of timing mechanism (not shown) can be employed in conjunction with the spark plug.

From the description so far, it is to be noted that the firing of the charge takes place in advance of the abutment plate 41 and that the expanding gases act between the abutment plate 41 and the abrupt shoulders 29 of the combustion chambers 27 for giving the desired power impulses to the rotor and that the exhaust takes place when the chambers 27 reach the exhaust cavity 49.

Disposed between the compression abutment plate 45 and the fuel inlet pipe 54 are fuel passageways 56 and 57. These passageways are formed within the side plates 16 and 17 and are employed for connecting the combustion chambers 27 with the compression chambers 30, as these chambers ride past the said passageways 56 and 57.

In operation of our improved motor, the properly mixed fuel charge is sucked into the combustion chambers through the fuel inlet pipe 54, as said combustion chambers ride past the pipe. As this charge is taken into a chamber 27, the chamber continues past the inlet pipe and the compression abutment plate 45 rides into said chamber and sweeps the charge toward the narrow end of the chamber and compresses the same. This gas under compression is forced by the said abutment plate 45 into the passageways 56 and 57, and into the compression chambers 30. This constitutes the initial compression of the charge.

As the inner compression chamber 30 rides past the point of the abutment plate 45, the abutment plates 47 ride into the said compression chamber 30 and recompress the charge and force the same toward the narrowing end of said chamber 30. When the charge reaches its high state of compression, the slide valves 35 are opened by the tracks 48 and the charge flows into the combustion chamber 27 between the main abutment plate 41 and the abrupt shoulder of the combustion chamber (see Figure 1). The spark plug 55 now fires the charge and the expanding gases operate between the abutment plate 41 and the abrupt shoulder causing a power impulse to be given to the rotor.

As the chamber with the fired charge comes into alinement with the exhaust cavity 49, the scavenging plate 43 rides into the said chamber and forces all of the spent gases out of the chamber into the exhaust cavity, the passageway 50, the passageway 51 and out through the exhaust passageway 52. The chamber is now ready for a fresh charge.

By referring to Figure 8, it will be seen that the incoming charge is heated by the exhaust gasses in the passageways 50 and 51 and thus, the temperature of the incoming charge is effectively raised. Owing to the fact that the exhaust port 52 extends under the rotor at a point adjacent to where the charge is taken in, the charge is efficiently preheated.

We have also provided novel means for cooling the stator casing at the point where the explosion takes place, so that the stator casing will not be subjected to undue distortion at this point. This means comprises a series of transversely extending air passageways 60 formed in the stator casing. These air passageways extend entirely through the rim of the casing and through the side plates.

From the foregoing description, it can be seen that we have provided a novel rotary motor in which an efficient means is formed for preheating the charge and for insuring the proper compression of the charge prior to the delivery thereof to the firing chamber.

Changes in details may be made without departing from the spirit or the scope of this invention but what we claim as new is:—

1. In a rotary internal combustion engine, a stator, a rotor, explosion and compression chambers formed in the outer faces of the rotor, compression chambers in the inner face of the rotor, means including abutment plates for cooperation with the walls of the chambers for compressing the charge therein, and means for establishing communication between the chambers on the inner and outer faces of said rotor.

2. In a rotary internal combustion engine, a stator, a rotor, compression and explosion chambers formed in the outer face of the rotor, compression chambers formed in the inner face of the rotor, a sliding abutment plate for initially compressing the charge in the outer chambers, a main abutment plate arranged in rear of the first abutment plate for engaging the walls of said chambers constituting an explosion head, internal abutment plates for engaging the walls of the inner chambers for compressing the charge therein, and means for delivering the compressed charge from the outer chambers to the inner chambers and redelivering the recompressed charge in the chambers to the outer chambers at the firing point.

3. In a rotary internal combustion engine, a stator, a rotor, compression and explosion chambers formed in the outer face of the rotor, compression chambers formed in the inner face of the rotor, a sliding abutment plate for initially compressing the charge in the outer chambers, a main abutment plate arranged in rear of the first abutment plate for engaging the walls of said chambers constituting an explosion head, internal abutment plates for engaging the walls of the inner chambers for compressing the charge therein, means for delivering the compressed charge from the outer chambers to the inner chambers and redelivering the recompressed charge in the chambers to the outer chambers at the firing point, and additional abutment plates for engaging the walls of the chambers to facilitate the scavenging thereof.

4. In a rotary internal combustion engine, a stator, a rotor including outer compression and explosion chambers and inner compression chambers, a sliding abutment plate carried by the stator and engaging the walls of the inner chambers for compressing the charge therein, a firing abutment head slidably carried by the stator and engaging in said chambers in rear of the first abutment plate, sliding abutment plates carried by the stator and engaging the walls of the inner chambers for compressing the charge therein, means for delivering a charge to the outer chambers in advance of the first mentioned abutment plates, means for delivering the charge after initial compression from the outer chambers to the inner chambers, means for delivering the recompressed charge from the inner chambers to the outer chambers at the firing point, and means for exhausting the spent gases from the outer chambers adjacent to the point of delivery of the incoming charge to preheat the same.

5. In a rotary internal combustion engine, a stator, a rotor including outer compression and explosion chambers and inner compression chambers, a sliding abutment plate carried by the stator and engaging the walls of the inner chambers for compressing the charge therein, a firing abutment head slidably carried by the stator and engaging in said firing chambers in rear of the first abutment plate, sliding abutment plates carried by the stator and engaging the walls of the inner chambers for compressing the charge therein, means for delivering a charge to the outer chambers in advance of the first mentioned abutment plates, means for delivering the charge after initial compression from the outer chambers to the inner chambers, means for delivering the recompressed charge from the inner chambers to the outer chambers at the firing point, and means for exhausting the spent gases from the outer chambers adjacent to the point of delivery of the incoming charge to preheat the same, and means for cooling the engine adjacent to the firing point.

6. In a rotary internal combustion engine, a stator including an annular rim and side plates connected to said rim having inwardly extending annular abutment shoulders, a drive shaft rotatably carried by the side plates, a rotor keyed to said shaft including an outer rim disposed between the stator rim and the annular shoulders, inner and outer chambers formed on the rotor rim, means for delivering a charge to the chambers on the outer face of the rotor, means for compressing the charge in said outer chambers, a main abutment plate constituting a firing head slidably carried by the stator and engaging the walls of said chamber, a spark plug carried by the stator adjacent to said last mentioned abutment plate, means for delivering the compressed charge from the outer chambers to the inner chambers, means for recompressing the charge in said inner chambers, and means for redelivering the recompressed charge to the outer chambers adjacent to the spark plug and between the main abutment plate and a wall of the outer firing chambers.

7. In a rotary internal combustion engine, a stator including an annular rim and side plates connected to said rim having inwardly extending annular abutment shoulders, a drive shaft rotatably carried by the side plates, a rotor keyed to said shaft including an outer rim disposed between the stator rim and the annular shoulders, inner and outer chambers formed on the rotor rim, means for delivering a charge to the chambers on the outer face of the rotor, means for compressing the charge in said outer chambers, a main abutment plate constituting a firing head slidably carried by the stator and engaging the walls of said chamber, a spark plug carried by the stator adjacent to said last mentioned abutment plate, means for delivering the compressed charge from the outer chambers to the inner chambers, means for recompressing the charge in said inner chambers, means for redelivering the recompressed charge to the outer chambers adjacent to the spark plug and between the main abutment plate and a wall of the outer chambers, and means including an abutment plate for driving the spent gases from the outer chambers.

8. In a rotary internal combustion engine, a stator including an annular rim and side plates connected to said rim, inwardly directed annular shoulders formed on the inner faces of said plates, a drive shaft rotatably carried by the side plates, a rotor keyed to said shaft having a rim arranged between the stator rim and said annular shoulders, the rotor rim having formed in its inner and outer faces chambers, said chambers being provided with an inner inclined wall and an abrupt end wall, a sliding abutment plate for engaging the walls of the outer chambers for compressing a charge therein, a main sliding abutment plate engaging the walls of the outer chambers in rear of the first abutment plate constituting a firing head, a spark plug carried by the stator arranged adjacent to the main abutment plate, passages formed in the side plates for connecting the inner and outer chambers together adjacent to the first mentioned abutment plate, whereby the compressed charge in the outer chambers will be delivered to the inner chambers, inwardly sliding abutment plates carried by the shoulders for recompressing the charge in the inner chambers, ports connecting the opposite ends of the inner and outer chambers together, slide valves controlling said ports, and means for automatically operating said valves to open said ports at predetermined times whereby to deliver the recompressed charge to the outer chamber adjacent to said spark plug.

9. In a rotary internal combustion engine, a stator including an annular rim and side plates connected to said rim, inwardly directed annular shoulders formed on the inner faces of said plates, a drive shaft rotatably carried by the side plates, a rotor keyed to said shaft having a rim arranged between the stator rim and said annular shoulders, the rotor rim having formed in its inner and outer faces chambers, said chambers being provided with an inner inclined wall and an abrupt end wall, a sliding abutment plate for engaging the walls of the outer chambers for compressing a charge therein, a main sliding abutment plate engaging the walls of the outer chambers in rear of the first abutment plate constituting a firing head, a spark plug carried by the stator arranged adjacent to the main abutment plate, passages formed in the side plates for connecting the inner and outer chambers together adjacent to the first mentioned abutment plate, whereby the compressed charge in the outer chambers will be delivered to the inner chambers, inwardly sliding abutment plates carried by the shoulders for recompressing the charge in the inner chambers, ports connecting the opposite ends of the inner and outer chambers together, slide valves controlling said ports, and means for automatically operating said valves to open said ports at predetermined times whereby to deliver the recompressed charge to the outer chamber adjacent to said spark plug, the stator rim at a point spaced from the main abutment plate being provided with a transverse exhaust cavity, a transversely extending exhaust passageway, one of the plates being provided with passageways for connecting the cavity and first mentioned exhaust passageway together, a sliding abutment plate carried by the stator for engaging the walls of the outer chambers for driving the spent gases into the exhaust cavity, and means extending through certain of the exhaust passageways for delivering a charge to the outer chambers.

ADOLPH E. GERLAT.
ANDREW C. HOPPE.
ANTHONY F. PIEPER.